US009379793B2

(12) United States Patent
Inoue et al.

(10) Patent No.: US 9,379,793 B2
(45) Date of Patent: Jun. 28, 2016

(54) RADIO COMMUNICATION SYSTEM, RADIO BASE STATION APPARATUS, USER TERMINAL AND RADIO COMMUNICATION METHOD

(75) Inventors: Yuki Inoue, Tokyo (JP); Tetsushi Abe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 165 days.

(21) Appl. No.: 14/238,264

(22) PCT Filed: Aug. 14, 2012

(86) PCT No.: PCT/JP2012/070696
§ 371 (c)(1),
(2), (4) Date: Feb. 11, 2014

(87) PCT Pub. No.: WO2013/024853
PCT Pub. Date: Feb. 21, 2013

(65) Prior Publication Data
US 2014/0192761 A1   Jul. 10, 2014

(30) Foreign Application Priority Data
Aug. 15, 2011   (JP) ................................. 2011-177605

(51) Int. Cl.
*H04L 1/00*   (2006.01)
*H04B 7/04*   (2006.01)
(Continued)

(52) U.S. Cl.
CPC .............. *H04B 7/0417* (2013.01); *H04B 7/024* (2013.01); *H04B 7/0456* (2013.01);
(Continued)

(58) Field of Classification Search
CPC ...... H04B 7/024; H04B 7/063; H04B 7/0417; H04B 7/0473; H04B 7/0617; H04B 7/0626; H04W 16/28; H04W 24/08

USPC ........... 370/252, 329, 330, 332; 455/501, 561, 455/562.1
See application file for complete search history.

(56) References Cited

U.S. PATENT DOCUMENTS

2011/0237270 A1*  9/2011  Noh ..................... H04B 7/0413
                                                          455/450
2012/0087435 A1*  4/2012  Gomadam ........... H04B 7/0452
                                                          375/285

(Continued)

OTHER PUBLICATIONS

International Search Report for corresponding International Application No. PCT/JP2012/070696, mailed Sep. 18, 2012 (4 pages).

(Continued)

*Primary Examiner* — Kwang B Yao
*Assistant Examiner* — Harun Chowdhury
(74) *Attorney, Agent, or Firm* — Osha Liang LLP

(57) ABSTRACT

The present invention is designed to reduce the space to install antennas and still increase the system capacity despite the state of the distribution of user terminals in cells. According to the radio communication method of the present invention, a radio base station apparatus selects precoding vectors from a codebook that is set in advance to be uneven with respect to the direction of the arrangement of antenna elements, based on communication quality information of the user terminals in the cell, multiplies signals to supply to each antenna element by the selected precoding vectors, and transmits the signals multiplied by the precoding vectors to the user terminals, and the user terminal receives a signal from the radio base station apparatus, extracts a reference signal from the received signal and measures channel quality; and feeds back a communication quality feedback signal, including the measured channel quality, to the radio base station apparatus, via the uplink.

9 Claims, 11 Drawing Sheets

(51) Int. Cl.
  *H04B 7/02* (2006.01)
  *H04B 7/06* (2006.01)
  *H04W 16/28* (2009.01)
  *H04W 72/04* (2009.01)
  *H04B 7/10* (2006.01)
  *H04W 24/10* (2009.01)

(52) U.S. Cl.
  CPC ............ *H04B 7/0473* (2013.01); *H04B 7/063* (2013.01); *H04B 7/0626* (2013.01); *H04B 7/0632* (2013.01); *H04B 7/0639* (2013.01); *H04W 16/28* (2013.01); *H04W 72/0413* (2013.01); *H04B 7/10* (2013.01); *H04W 24/10* (2013.01)

(56) References Cited

U.S. PATENT DOCUMENTS

2013/0109420 A1* 5/2013 Nilsson .................. H04B 7/024 455/501

2014/0160968 A1* 6/2014 Sahlin .................. H04W 24/10 370/252

OTHER PUBLICATIONS

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9);" Dec. 2009 (18 pages).

3GPP TS 36.211 V10.1.0; "3rd Generation Partnership Project; Technical Specification Group Radio Access Network; Evolved Universal Terrestrial Radio Access (E-UTRA); Physical Channels and Modulation (Release 10);" Mar. 2011 (103 pages).

* cited by examiner

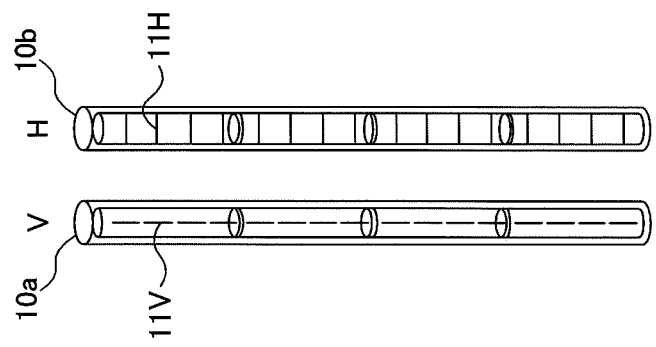
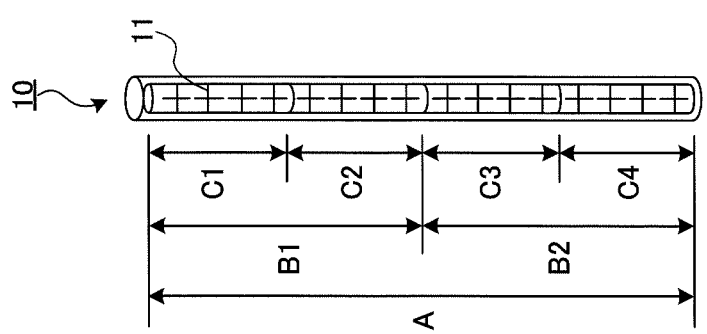
FIG. 1B   FIG. 1C
FIG. 1A

RADIO COMMUNICATION SYSTEM, RADIO BASE STATION APPARATUS, USER TERMINAL AND RADIO COMMUNICATION METHOD

TECHNICAL FIELD

The present invention relates to a next-generation radio communication system, radio base station apparatus, user terminal and radio communication method.

BACKGROUND ART

In a UMTS (Universal Mobile Telecommunications System) network, system features that are based on W-CDMA (Wideband Code Division Multiple Access) are maximized by adopting HSDPA (High Speed Downlink Packet Access) and HSUPA (High Speed Uplink Packet Access) for the purposes of improving the spectral efficiency and improving the data rate. For this UMTS network, long-term evolution (LTE) has been under study for the purposes of further increasing high-speed data rates, providing low delay and so on.

In the third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study as well (for example, LTE-Advanced (LTE-A)). For example, in LTE-A, there is a plan to expand the maximum system band for LTE specifications, which is 20 MHz, up to approximately 100 MHz. Also, in LTE-A, the maximum number of transmitting antennas according to LTE specifications is planned to be expanded from four antennas up to eight antennas.

Moreover, in a system of the LTE scheme, a MIMO (Multi Input Multi Output) system is proposed (see, for example, non-patent literature 1), as a radio communication technique to transmit and receive data by a plurality of antennas and improve the data rate (spectral efficiency). In the MIMO system, a plurality of transmitting/receiving antennas are provided in the transmitter/receiver, so that different transmission information sequences are transmitted from different transmitting antennas at the same time. Meanwhile, on the receiver side, taking advantage of the fact that fading variation is produced differently between the transmitting/receiving antennas, it is possible to increase the data rate (spectral efficiency) by separating and detecting the information sequences that have been transmitted at the same time.

In a system of the LTE scheme, single-user MIMO (SU-MIMO) transmission, in which transmission information sequences that are transmitted from different transmitting antennas at the same time are all directed to the same user, and multiple-user MIMO (MU-MIMO) transmission, in which transmission information sequences that are transmitted from different transmitting antennas at the same time are directed to different users, are defined. In these SU-MIMO transmission and MU-MIMO transmission, on the receiver side, an optimal PMI is to selected from a codebook, in which a plurality of amounts of phase/amplitude control (precoding matrix (precoding weights or precoding vectors)) to be set in the antennas of the transmitter and PMIs (Precoding Matrix Indicators) that are associated with this precoding matrix, are defined, and this is fed back to the transmitter as channel information (CSI: Channel State Information). On the transmitter side, precoding is performed for each transmitting antenna based on the PMI fed back from the receiver, and transmission information sequences are transmitted.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

In the system of the LTE-A scheme, which is under study as a successor system of LTE, MIMO transmission to use eight antennas is under study. Meanwhile, there is a need to support MIMO transmission (for example, SU-MIMO transmission to use two antennas, MU-MIMO transmission to use four antennas, and so on) that is employed in the system of the LTE scheme. Consequently, in MIMO transmission of the next generation radio communication system, it is necessary to support a plurality of types of communication, in which the number of antennas to be used varies. Meanwhile, in next generation radio communication systems, represented by the LTE-A scheme, providing eight antennas is under study. From the perspective of miniaturizing the transmitter/receiver, there is also a need to reduce the space to install these antennas.

On the other hand, when an antenna apparatus having a configuration to provide a plurality of antennas side by side in a horizontal direction is used, performing MIMO transmission with respect to a cell where users are crowded might make it not possible to increase the system capacity depending on the level of the density of user terminals (the state of distribution).

The present invention has been made in view of the above, and it is therefore an object of the present invention to provide a radio communication system, a radio base station apparatus, a user terminal and a radio communication method that can reduce the space to install antennas and that can also increase the system capacity despite the state of the distribution of user terminals in cells.

Solution to Problem

A radio communication system according to the present invention is a radio communication system having a radio base station apparatus to form a cell and user terminals to establish radio connection with the radio base station apparatus, and, in this radio communication system: the radio base station apparatus has: an array antenna having a plurality of antenna elements that are arranged in one direction; a selection section configured to select precoding vectors from a codebook that is set in advance to be uneven with respect to the direction of the arrangement of the antenna elements, based on communication quality information that is fed back from the user terminals in the cell; a precoding multiplication section configured to multiply signals to supply to each antenna element by the selected precoding vectors; and a transmission section configured to transmit the signals multiplied by the precoding vectors to the user terminals; and the user terminals have: a receiving section configured to receive a signal from the radio base station apparatus; a channel quality measurement section configured to extract a reference signal from the received signal and measures channel quality; and a transmission section configured to feed back a communication quality feedback signal, including the measured channel quality, to the radio base station apparatus, via an uplink.

A radio base station apparatus according to the present invention is a radio base station apparatus in a radio communication system having the radio base station apparatus to form a cell and user terminals to establish radio connection with the radio base station apparatus, and this radio base station apparatus has: an array antenna having a plurality of antenna elements that are arranged in one direction; a selection section configured to select precoding vectors from a codebook that is set in advance to be uneven with respect to the direction of the arrangement of the antenna elements, based on communication quality information of the user terminals in the cell; a precoding multiplication section configured to multiply signals to supply to each antenna element by the selected precoding vectors; and a transmission section configured to transmit the signals multiplied by the precoding vectors to the user terminals.

A user terminal according to the present invention is a user terminal in a radio communication system having a radio base station apparatus to form a cell and user terminals to establish radio connection with the radio base station apparatus, and this user terminal has: a receiving section configured to receive a signal transmitted from the radio base station apparatus using a codebook that is set in advance in the radio base station apparatus to be uneven with respect to a direction of arrangement of antenna elements based on communication quality information of the user terminals in the cell; a channel quality measurement section configured to extract a reference signal from the received signal and measures channel quality; and a transmission section configured to feed back a communication quality feedback signal, including the measured channel quality, to the radio base station apparatus, via an uplink.

A radio communication method according to the present invention is a radio communication method in a radio communication system having a radio base station apparatus to form a cell and user terminals to establish radio connection with the radio base station apparatus, and this radio communication method includes: at the radio base station apparatus: selecting precoding vectors from a codebook that is set in advance to be uneven with respect to the direction of arrangement of antenna elements, based on communication quality information of the user terminals in the cell; multiplying signals to supply to each antenna element by the selected precoding vectors; and transmitting the signals multiplied by the precoding vectors to the user terminals, and, at the user terminal: receiving a signal from the radio base station apparatus; extracting a reference signal from the received signal and measuring channel quality; and feeding back a communication quality feedback signal, including the measured channel quality, to the radio base station apparatus, via an uplink.

Technical Advantage of the Invention

According to the present invention, it is possible to reduce the space to install antennas and still increase the system capacity despite the state of the distribution of user terminals in cells.

BRIEF DESCRIPTION OF THE DRAWINGS

FIG. 1 provides schematic diagrams for explaining N types of communication that are provided by an array antenna in a radio base station apparatus according to the present invention;

DESCRIPTION OF EMBODIMENTS

Figure 2:
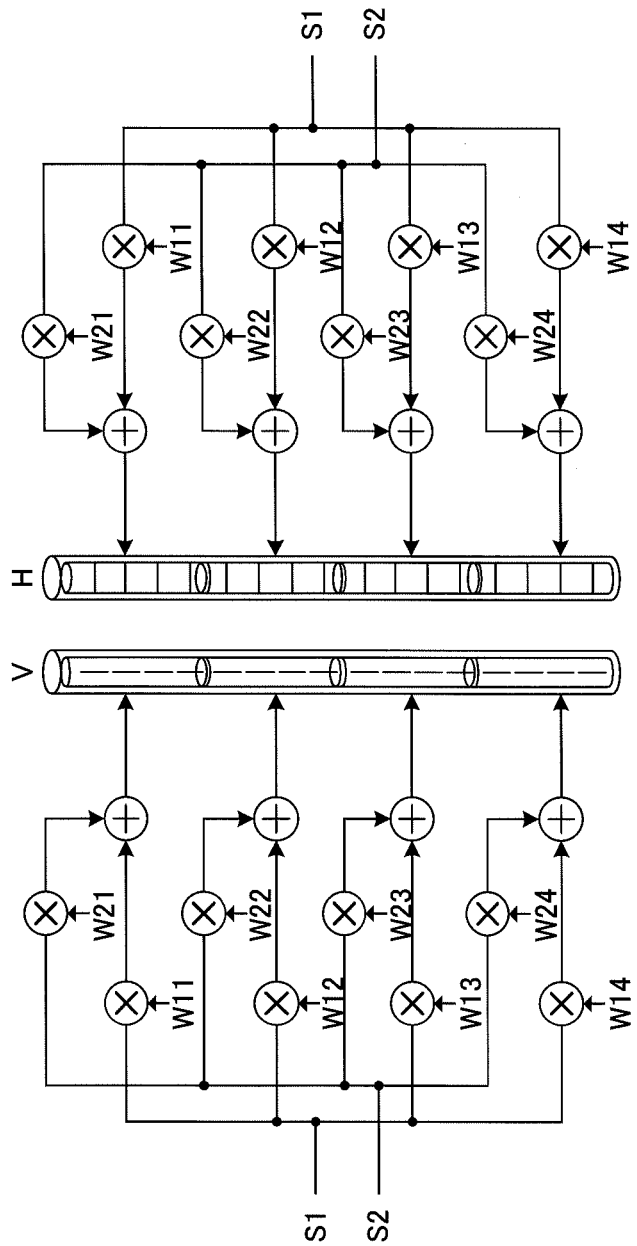
FIG. 2 is a schematic diagram for explaining a weight control for antenna elements constituting an array antenna.

Generally speaking, a plurality of antennas used in MIMO transmission are installed in positions of the same height in a radio base station apparatus. Then, in MIMO transmission, precoding weights (hereinafter referred to as "weights") are selected such that the data rate of user terminals in each cell improves the most, and transmission beams that can set directivity primarily in horizontal directions are formed. Given that a plurality of antennas are installed in positions of the same height, for example, in the system of the LTE-A scheme, space to install maximum eight antennas is necessary. Meanwhile, from the perspective of reducing the space to install a plurality of antennas, it may be possible to employ transmission beams which can set directivity primarily in vertical directions. In this case, there is no need to set a plurality of antennas in positions of the same height in the radio base station apparatus. Consequently, it is possible to arrange a plurality of antennas up and down, and reduce the space to install antennas.

Now, a configuration of a radio communication system according to an embodiment of the present invention will be described. The radio communication system according to the present embodiment has a radio base station apparatus (hereinafter referred to as "radio base station apparatus") which can form transmission beams that can set directivity in vertical directions. This radio base station apparatus has an array antenna that is formed with a plurality of antenna elements that are grouped into at least one group in association with N communication types, where N is an integer of 2 or more. Hereinafter, the N types of communication that are provided by the array antenna given in this radio base station apparatus will be described using FIG. 1. FIG. 1 is a schematic diagram for explaining N types of communication provided by the array antenna in the radio base station apparatus according to the present embodiment.

As shown in FIG. 1A, an array antenna 10 is formed with a plurality of antenna elements 11 that are arranged in a line in one direction—for example, in a vertical direction (in FIG. 1A, sixteen antenna elements 11 are shown as an example). With the present embodiment, the array antenna 10 is formed with a polarized antenna that combines a vertically polarized antenna 10a and a horizontally polarized antenna 10b. However, the present invention is by no means limited to a polarized antenna configuration. FIG. 1B is a conceptual diagram to show the vertically polarized antenna 10a alone, and FIG. 1C is a conceptual diagram to show the horizontally polarized antenna 10b alone. When a polarized antenna is adopted, the individual antenna elements 11 are each formed with a set of a vertically polarized element 11V and a horizontally polarized element 11H. Although a case will be described with the following description where the array antenna 10 of the radio base station is erected vertically, it is equally possible to provide the array antenna 10 diagonally (or horizontally), depending on the environment.

The first communication type is a type to form one group A with all of the antenna elements 11 constituting the array antenna 10, and form one antenna branch with the whole antenna. The second communication type is a type to divide the antenna elements 11 constituting the array antenna 10 up and down, into two, and form two antenna branches by dividing the antenna elements 11 into two groups, B1 and B2. The third communication type is a type to divide the antenna elements 11 constituting the array antenna 10 up and down, into four, and form four antenna branches by dividing the antenna elements 11 into four groups, C1, C2, C3 and C4. Although the first to third communication types (which may also be referred to as the number of antenna branches) will be shown as examples with the present embodiment, it is equally possible to set an arbitrary number of types of communication as adequate, depending on the number of divisions of the antenna elements 11 constituting the array antenna 10 in vertical directions. Also, the maximum number of branches can be selected as adequate, depending on the antenna elements 11.

Among the first to third communication types, the length of antennas to constitute one branch (the number of antenna elements) is the longest in the first communication type. The length of antennas per branch becomes shorter as the number of antenna branches increases. Generally speaking, when beams are formed using an array antenna, it is possible to improve the antenna gain and make the beam width smaller, as the number of antenna elements per branch increases. Consequently, according to the first communication type, the whole antenna is formed with one antenna branch, so that it is possible to form sharp beams that are directed toward cell edges.

In the array antenna 10, transmission signals, which are multiplied by weights on a per group basis, are input in the antenna elements 11. By controlling the weights, it is possible to form an arbitrary antenna branch with the array antenna 10. As shown in FIG. 2, transmission signals that are multiplied by the same weight in minimum antenna branch units (where the number of antenna elements is four) are supplied to the sixteen antenna elements 11 constituting the array antenna 10. Although a configuration which can combine two transmission signals S1 and S2 is shown in FIG. 2, the maximum number that can be combined is not limited to this. For example, when providing 8-multiplex MIMO, it is preferable to use a configuration which can combine four transmission signals S1, S2, S3 and S4 (see FIG. 5). The array antenna 10 can form a number of beams to match the number of transmission signals x the number of branches to constitute, at the same time.

Figure 3:
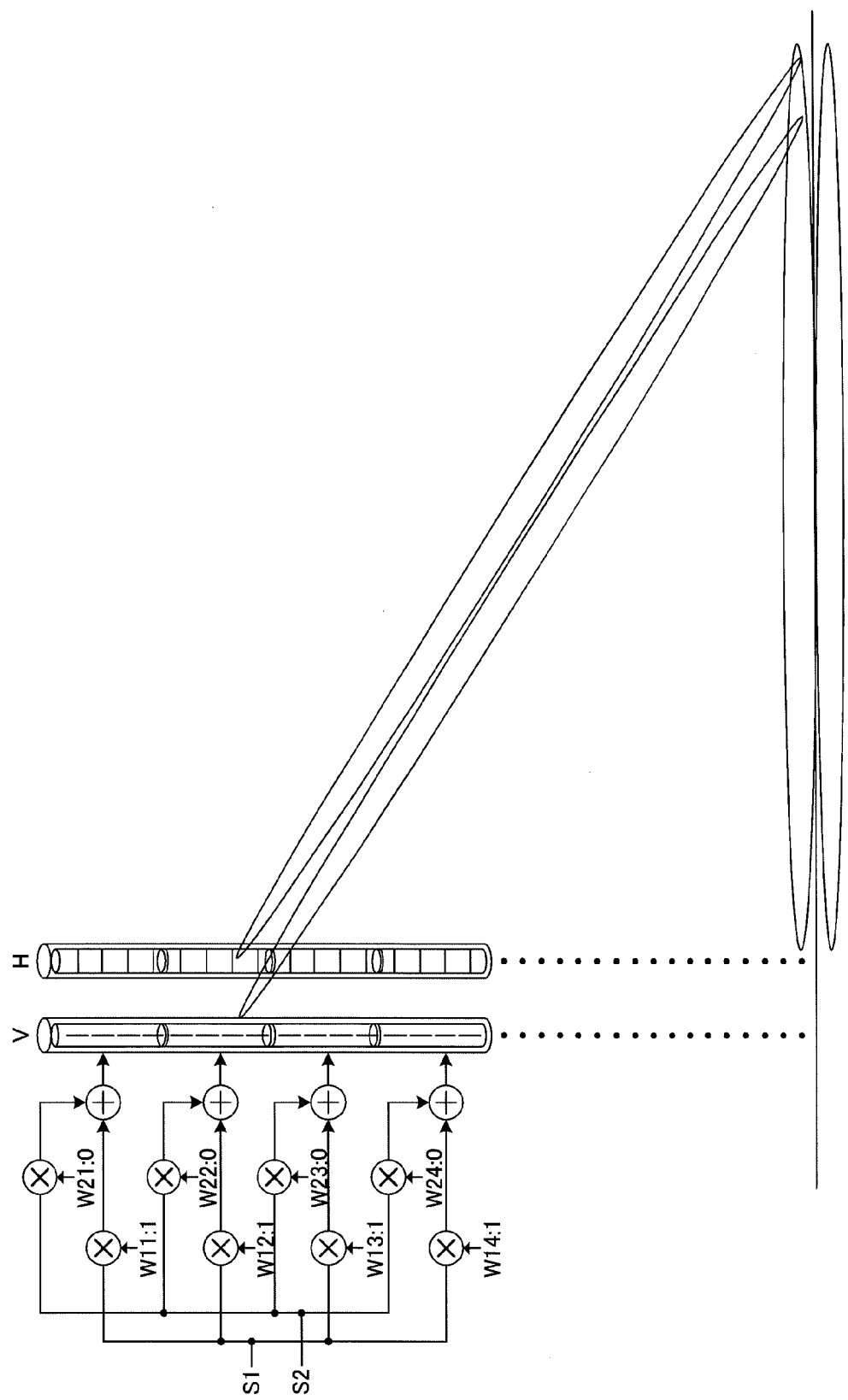
FIG. 3 is a schematic diagram for explaining a weight control for a first communication type.

In the first communication type, as shown in FIG. 3, the array antenna 10 multiplies transmission signal S1 to input in each antenna element 11 constituting one group A, by the same weight W (for example, W11, W12, W13, W14=1, 1, 1, 1). By this means, it is possible to form one beam having a high antenna gain and a narrow beam width. Note that, in FIG. 3, transmission signal S1 that is input in the horizontally polarized antenna 10b is omitted for ease of explanation. The vertically polarized antenna 10a and the horizontally polarized antenna 10b each form one beam, so that, with the array antenna 10, two beams are formed. Consequently, the first communication type can provide 2-multiplex MIMO transmission. If the receiver supports 2×2 MIMO transmission, 2×2 MIMO transmission can be realized. Also, with a receiver of a 1-antenna configuration, it is possible to provide space-frequency transmission diversity by SFBC (Space-Frequency Block Coding) using two antennas. Note that SFBC executes coding in the antenna/frequency domain.

Figure 4:
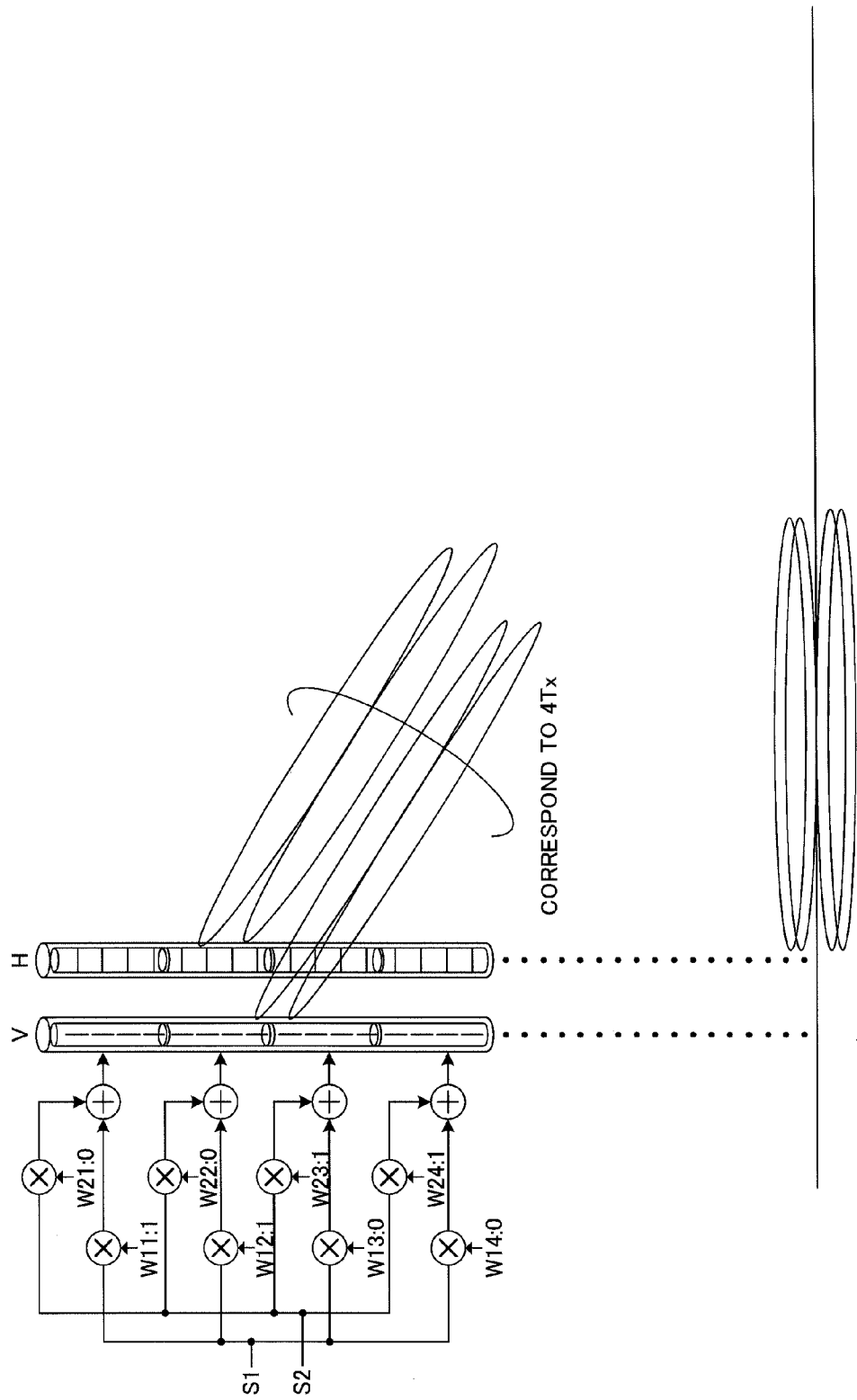
FIG. 4 is a schematic diagram for explaining a weight control for a second communication type.

With the second communication type, as shown in FIG. 4, the array antenna 10 multiplies transmission signal S1 to input in the antenna elements 11 constituting group B1 by weights W (for example, W11, W12, W13, W14=1, 1, 0, 0), and also multiplies transmission signal S2 to input in the antenna elements 11 constituting group B2 by weights W (for example, W21, W22, W23, W24=0, 0, 1, 1). By this means, it is possible to form beam 1 and beam 2 by two antenna branches corresponding to groups B1 and B2. Note that, in FIG. 4, transmission signals S1 and S2 to be input in the horizontally polarized antenna 10b are omitted for ease of explanation. The vertically polarized antenna 10a forms beam 1 and beam 2, and, at the same time, the horizontally polarized antenna 10b forms beam 1 and beam 2, so that the array antenna 10 is able to form total four beams in parallel. By directing the four beams that are formed in parallel toward the same area in a cell, 4-multiplex MIMO transmission is provided.

Figure 5:
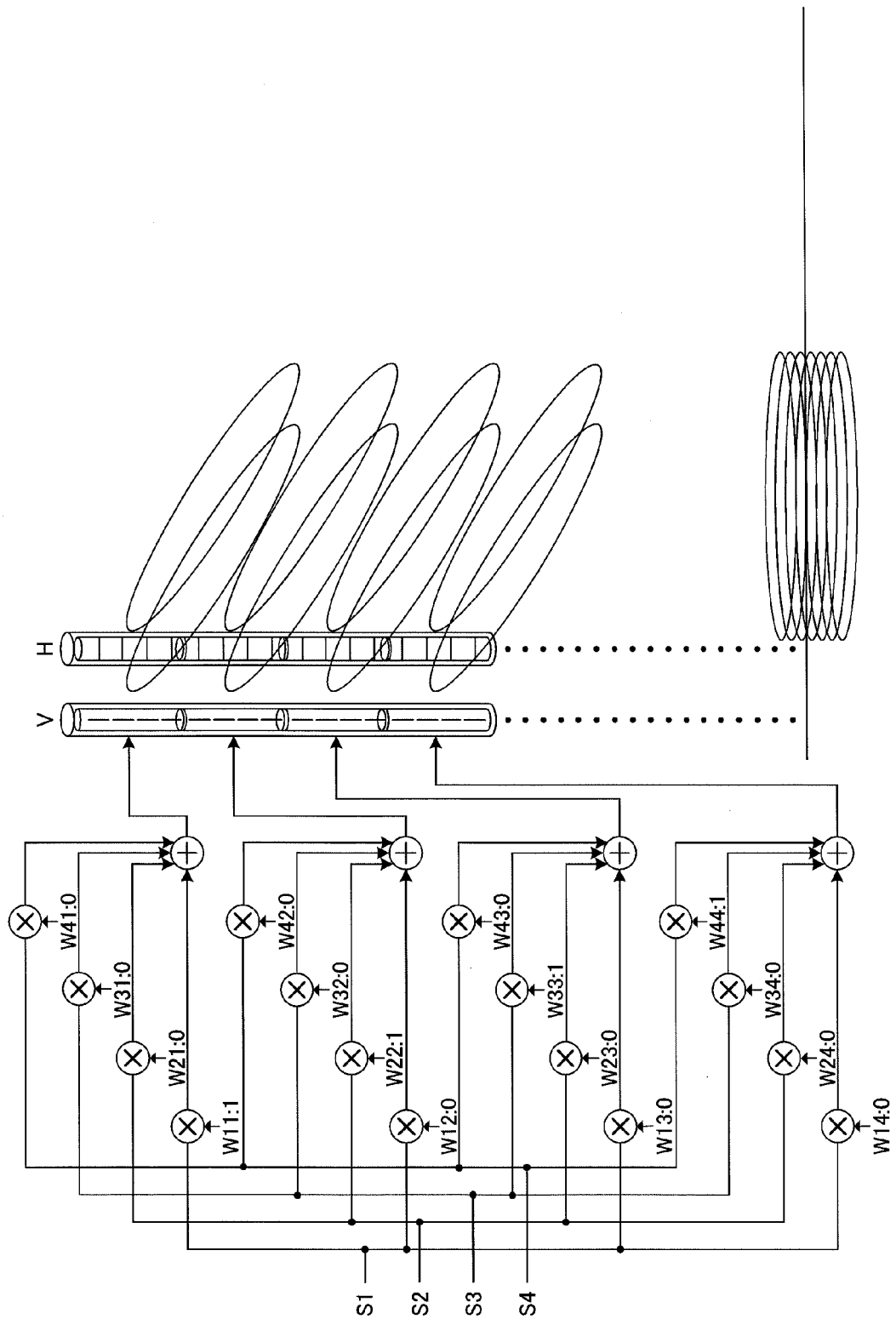
FIG. 5 is a schematic diagram for explaining a weight control for a third communication type.

With the third communication type, as shown in FIG. 5, the array antenna 10 multiplies transmission signal S1 to input in the antenna elements 11 constituting group C1 by weights W (for example, W11, W12, W13, W14=1, 0, 0, 0), and also multiplies transmission signal S2 to input in the antenna elements 11 constituting group C2 by weights W (for example, W21, W22, W23, W24=0, 1, 0, 0). Furthermore, the array antenna 10 multiplies transmission signal S3 to input in the antenna elements 11 constituting group C3 by weights W (for example, W31, W32, W33, W34=0, 0, 1, 0), and multiplies transmission signal S4 to input in the antenna elements 11 constituting group C4 by weights W (for example, W41, W42, W43, W44=0, 0, 0, 1). By this means, it is possible to form beam 1 to beam 4 by four antenna branches corresponding to groups C1 to C4. Note that, in FIG. 5, transmission signals S1 to S4 to be input in the horizontally polarized antenna 10b are omitted for ease of explanation. The vertically polarized antenna 10a forms four beams, and, at the same time, the horizontally polarized antenna 10b forms four beams, so that the array antenna 10 is able to form total eight beams in parallel. By directing the eight beams that are formed in parallel toward the same area in a cell, 8-multiplex MIMO transmission is provided.

With the radio communication system according to the present embodiment, it is possible to divide the array antenna 10 into one group or a plurality of groups by controlling the weights for transmission signals to be input in the antenna elements 11. By this means, it becomes possible to switch the desirable type of communication and transmit signals to user terminals UE.

Next, signaling in the radio communication system according to the present embodiment will be described. In the systems of the LTE scheme and the LTE-A scheme, a CRS (Cell-specific Reference Signal), a CSI-RS (Channel State Information-Reference Signal), and a user-specific DM-RS (Demodulation-Reference Signal) and so on are defined as downlink reference signals. A CRS is transmitted in all downlink subframes, and is placed over the entire downlink frequency band. A CRS is used in channel estimation for downlink coherent detection. A CSI-RS is a reference signal for channel information measurement, and is used to measure CSI (CQI, PMI, rank). A user-specific DM-RS is transmitted in resource blocks that are allocated for downlink shared channel (DL-SCH) transmission to individual user terminals UE. A user-specific DM-RS is a user-specific demodulation reference signal which can be used in channel estimation for coherent detection of the downlink shared channel.

Also, in the systems of the LTE scheme and the LTE-A scheme, a physical broadcast channel (PBCH) to transmit a synchronization signal (SS) that is used in a cell search to detect the cell which a user terminal UE should connect with, and the system information (SIB (System Information Block) and MIB (Master Information Block)) that is necessary after the cell search, is defined. Furthermore, the systems of the LTE scheme and the LTE-A scheme define a PDCCH (Physical Downlink Control Channel) for transmitting downlink control signals, and a PUCCH (Physical Uplink Control Channel) for transmitting uplink control signals. Furthermore, the systems of the LTE scheme and the LTE-A scheme define a PDSCH (Physical Uplink Control Channel) for transmitting downlink data (including part of the control signals), and a PUSCH (Physical Uplink Shared Channel) for transmitting uplink data (including part of the control signals).

The radio base station apparatus to constitute the radio communication system according to the present embodiment switches the type of communication depending on the types of signals such as these to transmit to user terminals UE and the functions of the user terminals UE. The functions of user terminals UE that are examined upon switching the communication type include, for example, whether or not a user terminal UE is a terminal to support LTE of Release 8 (Rel. 8), Release 9 (Rel. 9), Release 10 (Rel. 10) or Release 11 (Rel. 11).

For example, the radio base station apparatus transmits, in the first communication type, a CRS and a PDCCH for a user terminal supporting Rel. 8, Rel. 9, Rel. 10 or Rel. 11 LTE, and MIB/SIB/paging information. A user terminal UE that desires to connect with a cell must always receive a synchronization signal (SS) and a physical broadcast channel (PBCH), and therefore the synchronization signal (SS) and the physical broadcast channel (PBCH) have to encompass all in the area as their coverage. Consequently, the radio base station apparatus transmits these signals in beams that support communication type 1. Also, the radio base station apparatus transmits, in the first communication type, a PDSCH for a user terminal that supports Rel. 8 LTE and that supports 2×2 MIMO transmission.

Also, the radio base station apparatus transmits, in the second communication type, a CSI-RS that corresponds to four antenna ports for a user terminal that supports Rel. 10 LTE and that supports transmission mode 9. Also, the radio base station apparatus transmits, in the second communication type, a PDSCH and a DM-RS for a user terminal that supports Rel. 10 LTE and that supports transmission mode 9.

Furthermore, the radio base station apparatus transmits, in the third communication type, for example, a CSI-RS that corresponds to eight antenna ports for a user terminal that supports Rel. 10 LTE and that supports 8×8 MIMO transmission. Also, the radio base station apparatus transmits, in the third communication type, a PDSCH and a DM-RS for a user terminal that supports Rel. 10 LTE and that supports transmission mode 9.

In an existing system that uses an array to have the same element directivity (a radio base station apparatus which can form a plurality of transmission beams that can set directivity in horizontal directions), generally, a codebook is formed with precoding vectors (precoding weights) that divide the space evenly into a plurality (for example, into M) (3GPP TS 36.211 ver 10.1.0 6.3.4.2.3). The process of selecting each precoding vector from a codebook CODEBOOK$V[0, 1, \ldots, M-1]$ and performing precoding may be conceived by associating with communicating with user terminals using M patterns of directional beams. Then, the user terminals each select an optimal precoding vector. In this case, user terminals that communicate using varying precoding vectors are less susceptible to signal interference given that the directional beams (transmission beams) vary. That is, as more user terminals communicate using varying precoding vectors, it is possible to multiplex data spatially between varying user terminals, so that the system capacity increases.

However, when a vertical array antenna configuration is used (when a radio base station apparatus which can form a plurality of transmission beams that allow vertical sectorization is used), user terminals are located unevenly in the area (cell) that is subject to service, and therefore the possibility of selecting the same precoding vector increases, and a codebook that divides the above space evenly into a plurality (for example, into M) is not optimal. The present inventors propose a new codebook to solve this problem. This proposal is to increase the system capacity using a codebook containing precoding vectors that are set unevenly with respect to the direction of the arrangement of the antenna elements. By this means, it is possible to increase the density of precoding vectors in places where the density of user terminals is high, so that it is possible to improve the rate of multiplexing data spatially. Here, providing precoding vectors unevenly with respect to the direction of the arrangement of the antenna elements means using precoding vectors that are selected such that the angle of the transmission beams corresponding to the precoding vectors with respect to the direction of the arrangement of the antenna elements assumes angular intervals taking into account the unevenness of the distribution of user terminals and so on, instead of assuming regular angular intervals.

With the present invention, in a radio communication system including an array antenna, a codebook which defines a plurality of amounts of phase/amplitude control (precoding matrix) and PMIs (Precoding Matrix Indicators) that are associated with this precoding matrix is set. This codebook takes into account the unevenness of the distribution of user terminals, and is set to vary on a per radio base station apparatus basis depending on the state of the distribution of user terminals in cells.

Note that the state of the distribution of user terminals in cells may be assumed or predicted in advance upon cell design and determined. Based on the state of distribution determined in this way, the codebook is determined. That is to say, the state of the distribution of user terminals is predicted in advance, and then one distribution state is determined and the codebook to correspond to that distribution state is determined.

Figure 6:
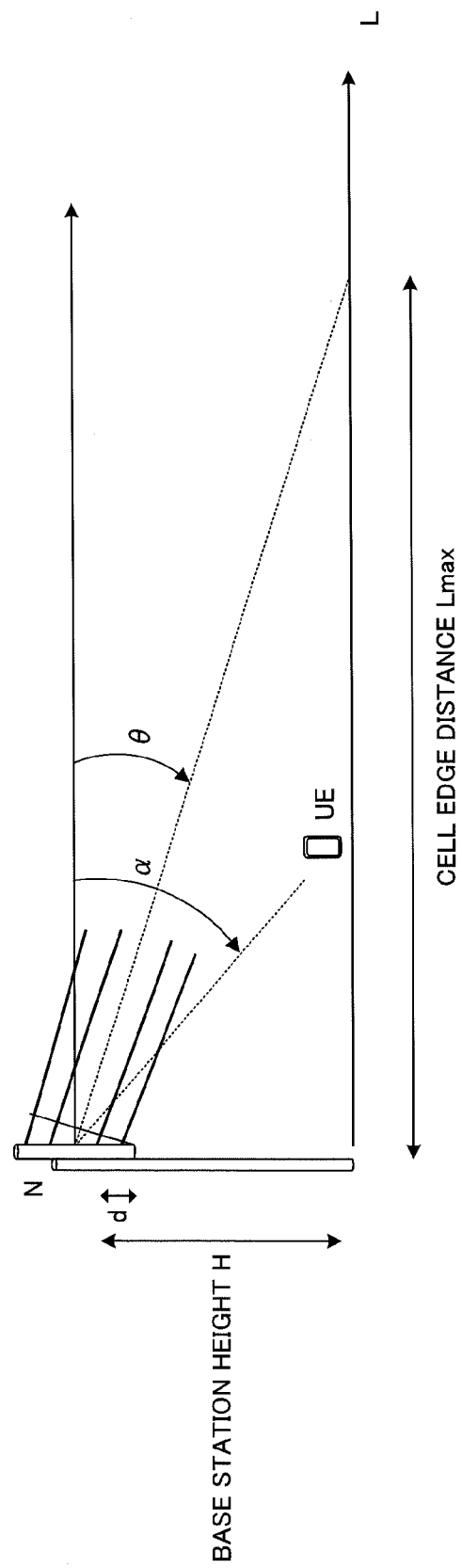
FIG. 6 is a schematic diagram for explaining a weight control in a radio communication system according to an embodiment.

In this case, the following may be possible as a specific codebook to take into account the unevenness of the distribution of user terminals in the cover area (cell). The precoding vectors in this codebook are set to be uniform at the reciprocal of the density of user terminals. When $\rho(L)$ is the distribution function of user terminals with respect to the distance from the radio base station apparatus, and L[m] is the distance from the radio base station apparatus, CODEBOOK$V[0,1, \ldots M-1] = \exp(2\pi d \cdot j \cos(\alpha + \pi/2) \cdot [0,1,2,\ldots,N-1])$ $\alpha = a\tan(h/(\rho(L \cdot [0,1,\ldots M-1])))$ holds. Here, as shown in FIG. 6, h is the height of the radio base station apparatus, d is the branch interval, α is the tilt angle of transmission beams directed to user terminals UE with respect to horizontal directions, and N is the number of branches. Also, θ is the tilt angle of transmission beams directed to cell edges with respect to horizontal directions.

Figure 7A:
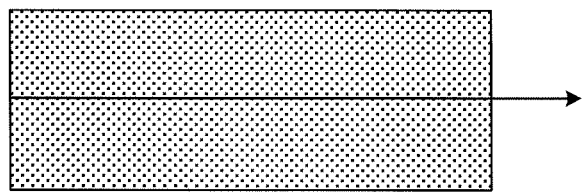
FIG. 7 provides diagrams for explaining a plurality of precoding vectors in a radio communication system according to an embodiment.
Figure 7B:
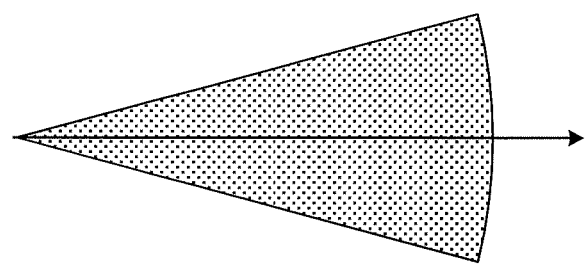

As the state of the distribution of user terminals in a specific cell, for example, a case where, as shown in FIG. 7A, user terminals are distributed evenly with respect to the distance from the radio base station apparatus (even), and a case where, as shown in FIG. 7B, user terminals are distributed squarefold, with respect to the distance from the radio base station apparatus (dense in cell edges) may be possible. For example, in the state of distribution shown in FIG. 7B, a codebook is formed with a plurality of precoding vectors that are set unevenly with respect to the direction of the arrangement of the antenna elements.

The codebook (precoding vector group) in this case is as follows:

$$\text{CODEBOOK } V[0,1,\ldots M-1] = \exp(2\pi d\cdot j \cos(\alpha+\pi/2)\cdot [0,1,2,\ldots,N-1])$$

$$\alpha = a\tan(h/(L\max/M)\cdot[0,1,\ldots M-1])) \quad (1)$$

(when user terminals are distributed evenly with respect to the distance from the radio base station apparatus: FIG. 7A)

$$\text{CODEBOOK } V[0,1,\ldots M-1] = \exp(2\pi rd\cdot j \cos(\alpha+\pi/2)\cdot [0,1,2,\ldots,N-1])$$

$$\alpha = a\tan(h/(L\max/\text{sqrt}(2)\hat{\ }[M-1,\ldots 1,0])) \quad (2)$$

(when user terminals are distributed squarefold with respect to the distance from the radio base station apparatus: FIG. 7B)

Figure 8:
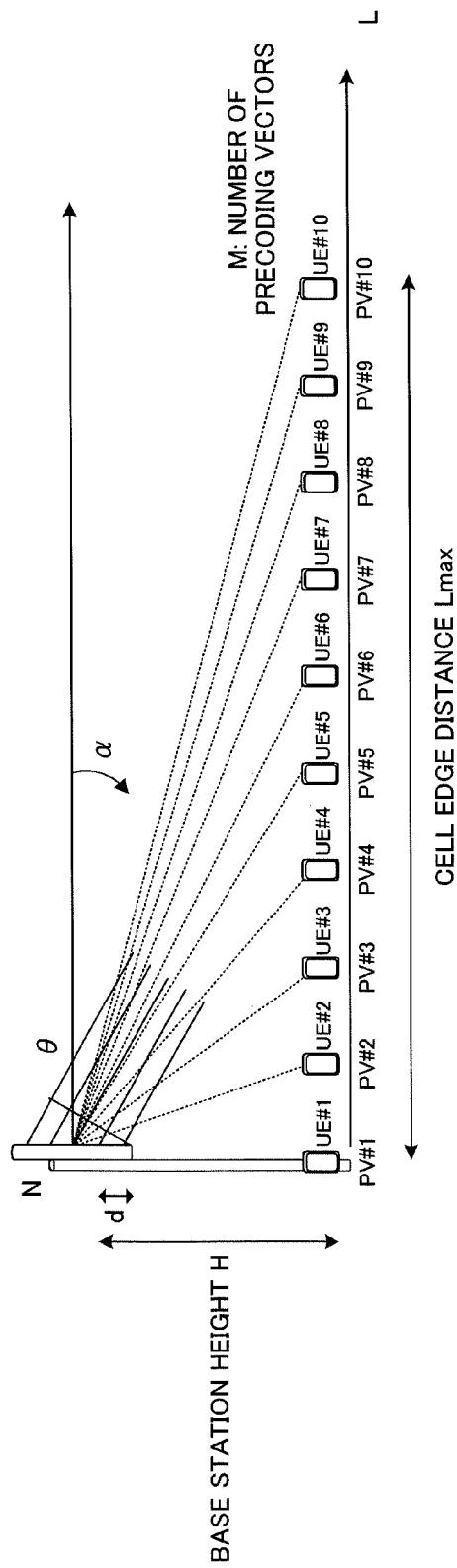
FIG. 8 is a diagram for explaining the state of distribution of user terminals.

A plurality of precoding vectors like these are, as shown in FIG. 8, set as adequate precoding vectors, with respect to the distance from the radio base station apparatus. For example, in FIG. 8, optimal precoding vector PV #1 is set in user terminal UE #1 that is the closest from the radio base station apparatus, and optimal precoding vector PV #2 is set in user terminal UE #2 that is the next closest from the radio base station apparatus. Then, similarly, optimal precoding vectors PV #3 to PV #10 are set in user terminals UE #3 to UE #10, respectively, which are the next closest from the radio base station apparatus. Note that the number of precoding vectors M is not particularly limited. For example, it is equally possible to determine the number of precoding vectors M such that null is directed toward areas corresponding to neighboring precoding vectors depending on the beam width of the directivity of the antennas of the radio base station apparatus.

The state of the distribution of user terminals in a cell may be determined using uplink signals. For example, when the state of distribution is determined using uplink signals, the state of distribution may be determined using, for example, the distance from the radio base station apparatus, estimated using each user terminal's uplink signal (PUCCH (Physical Uplink Control Channel) or PUSCH (Physical Uplink Shard Channel)), the angle of the radio base station apparatus with respect to the user terminals, estimated using the uplink signal (PUCCH or PUSCH), the distance from the radio base station apparatus, figured out by acquiring position information estimated separately in the user terminals by GPS and so on and by using position information acquired from the uplink signal (PUCCH or PUSCH), and the distance from the radio base station apparatus estimated using methods such as signal delay time and so on.

Selection of precoding vectors using codebooks that are set in this way will be described. As described above, these codebooks are provided in the radio base station apparatus and user terminals. Also, such a codebook is a codebook that takes into account the unevenness of the distribution of user terminals, and, if ρ(L) is the distribution function of user terminals with respect to the distance from the radio base station apparatus and L[m] is the distance from the radio base station apparatus, this codebook is formed with M precoding vectors represented by:

$$\text{CODEBOOK } V[0,1,\ldots M-1] = \exp(2\pi rd\cdot j \cos(\alpha+\pi/2)\cdot [0,1,2,\ldots,N-1])$$

$$\alpha = a\tan(h/(\rho(L\cdot f[0,1,\ldots M-1])))$$

First, a user terminal calculates the SIR (Signal to Interference Ratio) and an estimated value H' of the channel matrix based on reference signals (CRS (Cell-specific Reference Signal) and CSI-RS (Channel State Information-Reference Signal)) transmitted from the radio base station apparatus. The CQI (Channel Quality Indicator) and RI (Rank Indicator) are selected based on communication quality information such as H', SIR, RSRQ and so on, such that the block error rate does not exceed a predetermined error rate. As for the PMI (Precoding Matrix Indicator), the one that is the closest to H' is selected from M precoding vectors (a plurality of precoding vectors above), which define a plurality of amounts of phase/amplitude control (precoding matrix) and PMIs that are associated with this precoding matrix. The user terminal reports these pieces of communication quality information CSI (CQI, PMI, RI) to the radio base station apparatus.

Next, based on the communication quality information CSI reported from the user terminal, the radio base station apparatus updates the allocation of resources for transmitting that user terminal's data signal (PDSCH (Physical Downlink Shard Channel)), the setting of the number of MIMO transmission layers and precoding, the coding rate and so on as adequate, and attaches a reference signal (DM-RS (Demodulation-Reference Signal)) to the data signal (PDSCH) and transmits this with that information. Consequently, the radio base station apparatus extracts the PMI from the CSI information that is fed back from the user terminal, and, based on this PMI, selects an optimal precoding vector from a codebook that is set in advance based on the state of the distribution of user terminals in the cell.

Alternately, in the state in which there is no signaling from the user terminal, the radio base station apparatus may select an optimal precoding vector, from a codebook that is set in advance based on the state of the distribution of user terminals in the cell, using communication quality information such as the RSRP (Reference Signal Received Power), RSRQ (Reference Signal Received Quality), and SINR (Signal to Interference plus Noise Ratio) of the uplink signal.

Next, the radio base station apparatus updates the allocation of resources for transmitting the user terminal's data signal (PDSCH), the setting of the number of MIMO transmission layers and precoding, the coding rate and so on, as adequate and have this reflected on the antenna apparatus. Then, the radio base station apparatus attaches a reference signal (DM-RS) to the data signal (PDSCH) using the selected precoding vector, with these pieces of information, and transmits these.

In this way, a codebook that takes into account the unevenness of user terminals in the service area is set, and precoding vectors are selected based on user terminal communication quality information, so that the system capacity increases.

When MIMO transmission is performed in the radio base station apparatus, precoding vectors are generated. The precoding vectors are multiplied on a per resource element (RE) basis. Consequently, by changing the precoding vectors upon transmitting system information (SS (Synchronized Signal), PBCH (Primary Broadcast Channel)) and reference signals (CRS, CSI-RS), and the precoding vectors upon transmitting control signals (PDCCH, PCFICH (Physical Control Format Indicator Channel) and PHICH (Physical Hybrid-ARQ Indicator Channel)), it is possible to change the transmission area of each signal.

For example, the CRS, CSI-RS, and PDCCH can use precoding vectors of a codebook of $\exp(2\pi d \cdot j \cdot \cos(\theta+\pi/2) \cdot [0, 1, 2, \ldots, N-1])$, and the DM-RS and PDSCH can select a PMI on the user terminal side using the CSI-RS, and use precoding vectors of the codebook that is selected based on that reported PMI.

Although a case has been described with the above description where a vertical codebook CODEBOOKV alone is used, the present invention is by no means limited to this, and it is equally possible to take into account the state of the distribution of user terminals and use a new codebook CODEBOOK3D by combining a conventional horizontal codebook CODEBOOKH and a vertical codebook CODEBOOKV:

CODEBOOK3D$[0,1,\ldots M\times P-1]$=

CODEBOOKV$[0,1, \ldots M-1]\times$CODEBOOKH$[0,1,\ldots P-1]$

Now, an embodiment of the present invention will be described below in detail with reference to the accompanying drawings. Here, a case of using a radio base station apparatus and mobile station apparatuses supporting the LTE-A system will be described.

Figure 9:
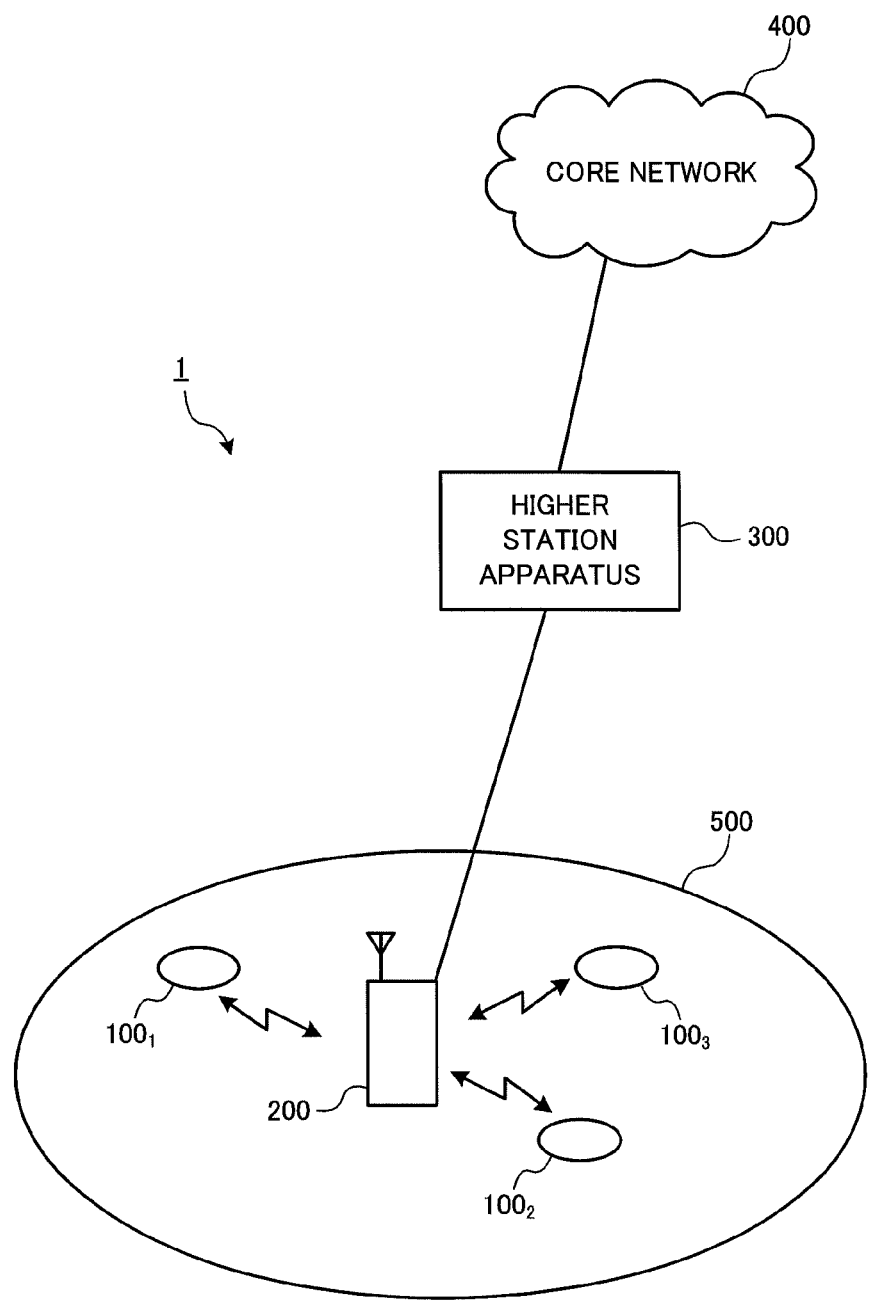
FIG. 9 is a diagram showing a network configuration of a radio communication system according to an embodiment.

A radio communication system 1 having a mobile station apparatus (hereinafter referred to as "mobile station") 100 as a user terminal, and a radio base station apparatus (eNodeB) 200, according to an embodiment of the present invention, will be described with reference to FIG. 9. FIG. 9 is a diagram to explain the configuration of the radio communication system 1 having users 100 and a radio base station apparatuses 200 according to an embodiment of the present invention. Note that the radio communication system 1 shown in FIG. 9 is a system to accommodate, for example, the LTE system or SUPER 3G. Also, this radio communication system 1 may be referred to as IMT-Advanced or may be referred to as 4G.

As shown in FIG. 9, the radio communication system 1 is configured to include a radio base station apparatus 200 and a plurality of mobile stations 100 (100$_1$, 100$_2$, 100$_3$, ... 100$_n$, where n is an integer to satisfy n>0) that communicate with this radio base station apparatus 200. The radio base station apparatus 200 is connected with a higher station apparatus 300, and this higher station apparatus 300 is connected with a core network 400. The user terminals 100 communicate with the radio base station apparatus 200 in a cell 500. Note that the higher station apparatus 300 includes, for example, an access gateway apparatus, a radio network controller (RNC), a mobility management entity (MME) and so on, but is by no means limited to these.

The mobile stations (100$_1$, 100$_2$, 100$_3$, ... 100$_n$) have the same configuration, functions and state, and therefore will be described below simply as "mobile station 100," unless specified otherwise. Also, although the mobile station apparatuses 100 will be described to perform radio communication with the radio base station apparatus 200 for ease of explanation, more generally, user apparatuses (UE: User Equipment), including mobile terminal apparatuses and fixed terminal apparatuses, may be used as well.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. On the downlink, a PDSCH, which is used by each mobile station 10 on a shared basis, and downlink L1/L2 control channels (PDCCH, PCFICH, PHICH) are used. By means of this PDSCH, user data, that is, normal data signals, is transmitted. Transmission data is included in this user data. Note that the component carriers (CC) and scheduling information allocated to the mobile station 100 in the radio base station apparatus 200 are reported to the mobile station 100 by the L1/L2 control channels.

On the uplink, a PUSCH (Physical Uplink Shared Channel), which is used by each mobile terminal apparatus 100 on a shared basis, and a PUCCH (Physical Uplink Control Channel), which is an uplink control channel, are used. User data is transmitted by means of this PUSCH. Also, downlink radio quality information (CQI: Channel Quality Indicator) and so on are transmitted by the PUCCH.

Figure 10:
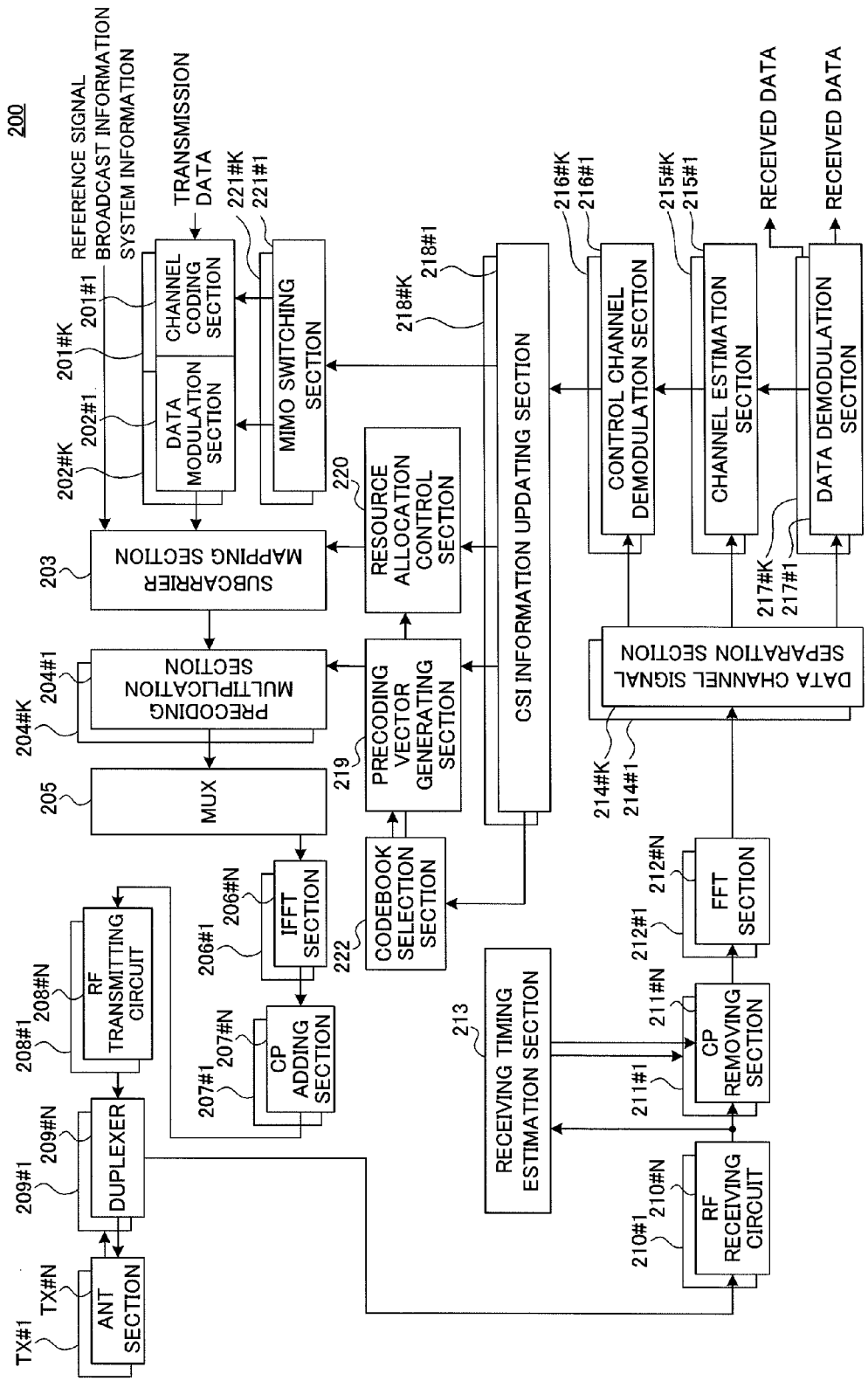
FIG. 10 is a block diagram showing a configuration of a radio base station apparatus according to an embodiment.
Figure 11:
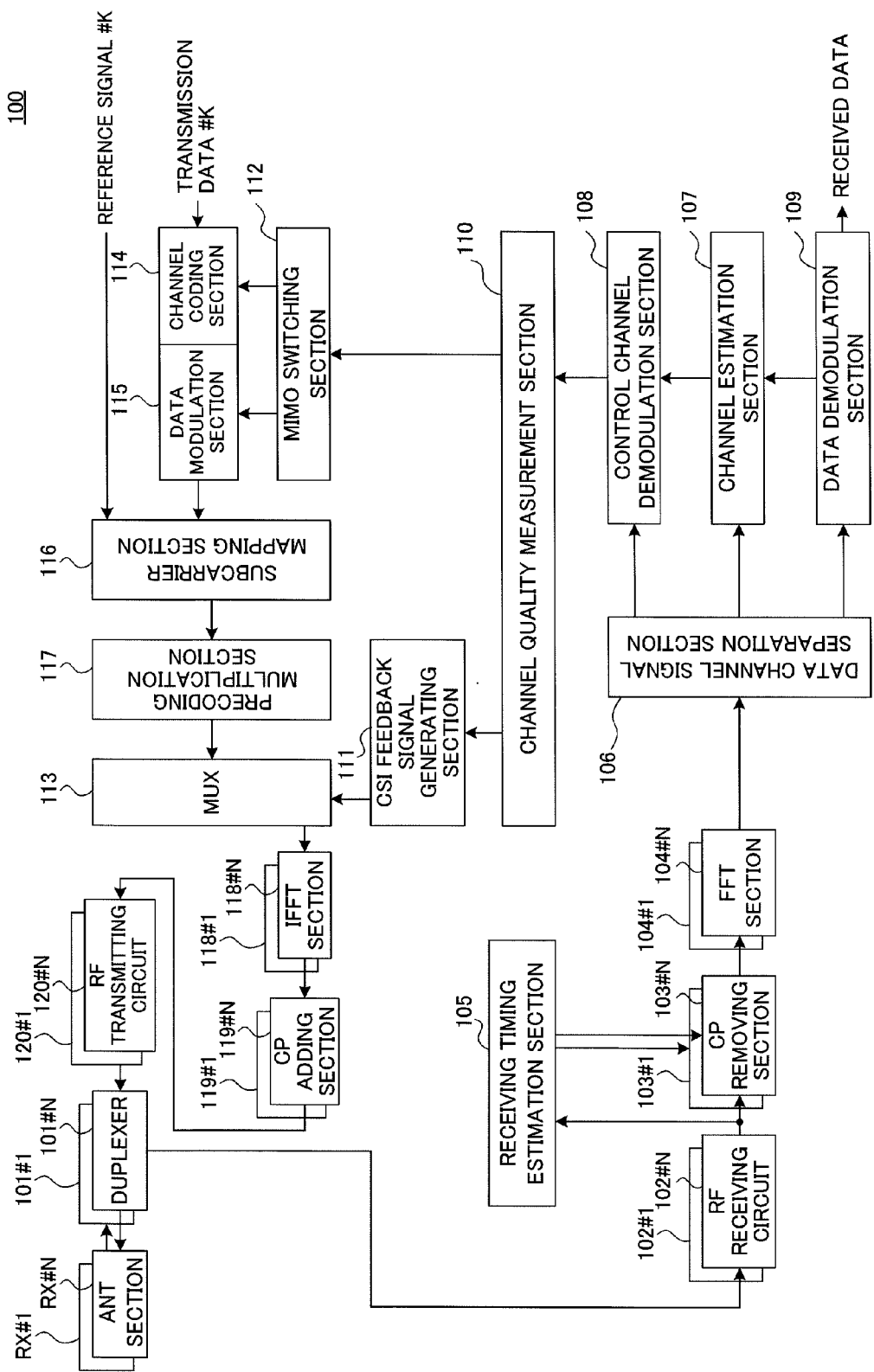
FIG. 11 is a block diagram showing a configuration of a mobile station according to an embodiment.

FIG. 10 is a block diagram showing a configuration of the radio base station apparatus 200 according to the present embodiment. FIG. 11 is a block diagram showing a configuration of the mobile station 100 according to the present embodiment. Note that, although the configurations of the radio base station apparatus 200 and the mobile station 100 shown in FIG. 10 and FIG. 11 are simplified to explain the present invention, these have configurations which a normal radio base station apparatus and mobile station should have.

In the radio base station apparatus 200 shown in FIG. 10, a scheduler, which is not shown, determines the number of users to multiplex (the number of users multiplexed) based on channel estimation values given from channel estimation sections 215 #1 to 215 #K, which will be described later. Then, the details of uplink/downlink resource allocation for each user (scheduling information) are determined, and transmission data #1 to #K to correspond to users #1 to #K are output to corresponding channel coding sections 201 #1 to 201 #K.

Transmission data #1 to #K are subject to channel coding in channel coding sections 201 #1 to 201 #K, and, after that, output to data modulation sections 202 #1 to 202 #K and subjected to data modulation. When this takes place, the channel coding and the data modulation are performed based on the channel coding rates and modulation schemes given from MIMO switching sections 221 #1 to 221 #K, which will be described later. Transmission data #1 to #K, having been subjected to data modulation in data modulation sections 202 #1 to 202 #K, are subjected to an inverse Fourier transform in a discrete Fourier transform section (not shown) and converted from time sequence signals to frequency domain signals, and output to a subcarrier mapping section 203.

The subcarrier mapping section 203 maps transmission data #1 to #K to subcarriers in accordance with resource allocation information that is given from a resource allocation control section 220, which will be described later. Then, the subcarrier mapping section 203 maps (multiplexes) reference signals #1 to #K that are received as input from a reference signal generating section, which is not shown, and broadcast information and system information that are received as input from a broadcast information generating section and a system information generating section, to subcarriers, with transmission data #1 to #K. Transmission data #1 to #K mapped to subcarriers in this way are output to precoding multiplication sections 204 #1 to 204 #K.

Precoding multiplication sections 204 #1 to 204 #K apply a phase and/or amplitude shift to transmission data #1 to #K, for each of antennas TX #1 to TX #N, based on precoding vectors given from a precoding vector generating section 219 (weighting of antenna TX #1 to antenna TX #N by precoding), which will be described later. Transmission data #1 to #K, having been subjected to a phase and/or amplitude shift by precoding multiplication sections 204 #1 to 204 #K, are output to a multiplexer (MUX) 205. Note that the precoding vectors are selected from a codebook that is set in advance taking into account the state of the distribution of user terminals in the cell.

In the multiplexer (MUX) 205, transmission data #1 to #K having been subjected to a phase and/or amplitude shift are combined, and transmission signals are generated for each of antennas TX #1 to TX #N. The transmission signals generated in the multiplexer (MUX) 205 are subjected to an inverse fast Fourier transform in inverse fast Fourier transform sections (IFFT sections) 206 #1 to 206 #N and converted from frequency domain signals to time domain signals. Then, after CPs are attached in cyclic prefix (CP) adding sections 207 #1 to 207 #N, the signals are output to RF transmitting circuits 208 #1 to 208 #N. Then, after a frequency conversion process for conversion to a radio frequency band is executed in RF transmitting circuits 208 #1 to 208 #N, the signals are output to antennas TX #1 to TX #N via duplexers 209 #1 to 209 #N, and output from antennas TX #1 to TX #N to the mobile station 100 on the downlink.

Meanwhile, transmission signals output from the mobile station 100 on the uplink are received in antennas TX #1 to TX #N, electrically separated into the transmitting route and the receiving route in duplexers 209 #1 to 209 #N, and, after that, output to RF receiving circuits 210 #1 to 210 #N. Then, a frequency conversion process for conversion from radio frequency signals into baseband signals is performed in RF receiving circuits 210 #1 to 210 #N. The baseband signals, to which the frequency conversion process has been applied, have the CPs removed in CP removing sections 211 #1 to 211 #N, and then output to fast Fourier transform sections (FFT sections) 212 #1 to 212 #N. The receiving timing estimation section 213 estimates receiving timing from the reference signals included in the received signals, and reports the estimation results to CP removing sections 211 #1 to 211 #N. FFT sections 212 #1 to 212 #N perform a Fourier transform on the received signals that are received as input, and convert the time sequence signals into frequency domain signals. These received signals converted into frequency domain signals are output to data channel signal separation sections 214 #1 to 214 #K.

Data channel signal separation sections 214 #1 to 214 #K separate the received signals received as input from FFT sections 212 #1 to 212 #N, by, for example, the minimum mean squared error (MMSE) and maximum likelihood detection (MLD) signal separation methods. By this means, the received signals that have arrived from the mobile station 100 are divided into received signals pertaining to user #1 to user #K. Channel estimation sections 215 #1 to 215 #K estimate the channel state from the reference signals included in the received signals separated in data channel signal separation sections 214 #1 to 214 #K, and report the estimated channel state to control channel demodulation sections 216 #1 to 216 #K.

The received signals pertaining to user #1 to user #K, separated by data channel signal separation sections 214 #1 to 214 #K, are demapped in a subcarrier demapping section, which is not shown, and converted back to time sequence signals, and, after that, subjected to data demodulation in data demodulation sections 217 #1 to 217 #K. Then, by executing a channel decoding process in channel decoding sections #1 to #K, which are not shown, the received data is acquired.

Control channel demodulation sections 216 #1 to 216 #K demodulate the control channel signals (for example, the PDCCH) included in the received signals separated in data channel signal separation sections 214 #1 to 214 #K. At this time, based on the channel state reported from channel estimation sections 215 #1 to 215 #K, control channel demodulation sections 216 #1 to 216 #K demodulate the control channel signals corresponding to user #1 to user #K. The control channel signals demodulated by control channel demodulation sections 216 #1 to 216 #K are output to CSI information updating sections 218 #1 to 218 #K.

CSI information updating sections 218 #1 to 218 #K extract the channel state information (CSI) included in each control channel signal (for example, the PUCCH) received as input from control channel demodulation sections 216 #1 to 216 #K, and always maintains the CSI in the latest state. For example, the CSI include PMIs, RIs and CQIs. Each CSI that is updated in CSI information updating sections 218 #1 to 218 #K is output to the precoding vector generating section 219, a resource allocation control section 220, MIMO switching sections 221 #1 to 221 #K and a codebook selection section 222.

The codebook selection section 222 extracts the PMIs from the CSI information given from CSI information updating sections 218 #1 to 218 #K, and, based on the PMIs, selects optimal precoding vectors from M types of precoding vectors in a codebook that is set to be uneven with respect to the direction of the arrangement of the antenna elements. Note that the codebook that is set to be uneven with respect to the direction of the arrangement of the antenna elements can be determined from the following equation (can be set to be uniform at the reciprocal of the density of user terminals), using $\rho(L)$ as the distribution function of user terminals with respect to the distance from the radio base station apparatus and $L[m]$ as the distance from the radio base station apparatus:

CODEBOOK$V[0,1,\ldots M-1]$=exp($2\pi d \cdot j \cos(\alpha+\pi/2)\cdot$
   $[0,1,2,\ldots,N-1]$)

$\alpha = a\tan(h/(\sigma(L \cdot [0,1,\ldots M-1])))$

Here, h is the height of the radio base station apparatus, d is the branch interval, a is the tilt angle of transmission beams directed to user terminals UE with respect to horizontal directions, and N is the number of branches.

Also, the distribution function $\rho(L)$ of user terminals with respect to the distance from the radio base station apparatus may be determined from, for example, the distance from the radio base station apparatus, estimated using each user terminal's uplink signal (PUCCH or PUSCH), the angle of the radio base station apparatus with respect to the user terminals, estimated using the uplink signal (PUCCH or PUSCH), the distance from the radio base station apparatus, figured out by acquiring position information estimated separately in the user terminals by GPS and so on and by using position information acquired from the uplink signal (PUCCH or PUSCH), and the distance from the radio base station apparatus estimated using methods such as signal delay time and so on.

The precoding vector generating section 219 generates precoding vectors that represent the amounts of a phase/ amplitude shift for transmission data #1 to #K, based on the CSI received as input from CSI information updating sections 218 #1 to 218 #K. The precoding vectors are generated from the codebook selected in codebook selection section 222. The precoding vectors that are generated are output to precoding multiplication sections 204 #1 to 204 #K, and used for the precoding of transmission data #1 to transmission data #K.

The resource allocation control section 220 determines the resource allocation information to allocate to each user based on the CSI received as input from CSI information updating sections 218 #1 to 218 #K. The resource allocation information that is determined by the resource allocation control section 220 is output to the subcarrier mapping section 203 and used for the mapping of transmission data #1 to transmission data #K.

MIMO switching sections 221 #1 to 221 #K select the MIMO transmission schemes to use for transmission data #1 to transmission data #K based on the CSI received as input from CSI information updating sections 218 #1 to 218 #K. Then, the channel coding rates and modulation schemes for transmission data #1 to transmission data #K to match the selected MIMO transmission schemes are determined. The determined channel coding rates are output to channel coding sections 201 #1 to 201 #K, respectively, and the determined modulation schemes are output to data modulation sections 202 #1 to 202 #K, respectively.

Meanwhile, in the mobile station 100 shown in FIG. 11, transmission signals output from the radio base station apparatus 200 are received by antennas RX #1 to RX #N, electrically separated into the transmitting route and the receiving route in duplexers 101 #1 to 101 #N, and then output to RF receiving circuits 102 #1 to 102 #N. Then, a frequency conversion process to convert radio frequency signals into baseband signals is performed in RF receiving circuits 102 #1 to 102 #N. The baseband signals to which the frequency conversion process has been applied have the CPs removed in cyclic prefix (CP) removing sections 103 #1 to 103 #N, and, after that, output to fast Fourier transform sections (FFT sections) 104 #1 to 104 #N. The receiving timing estimation sections 105 estimates the receiving timing from the reference signals included in the received signals, and reports the estimation result to CP removing sections 103 #1 to 103 #N. FFT sections 104 #1 to 104 #N perform a Fourier transform on the received signals that are received as input, and convert the time sequence signals into frequency domain signals. The received signals, converted into frequency domain signals, are output to data channel signal separation section 106.

The data channel signal separation section 106 separates the received signals received as input from FFT sections 104 #1 to 104 #N, by, for example, the minimum mean squared error (MMSE) and maximum likelihood detection (MLD) signal separation methods. By this means, received signals having arrived from the radio base station apparatus 200 are separated into received signals pertaining to user #1 to user #K, and the received signal pertaining to the user of the mobile station 100 (here, user K) is extracted. The channel estimation section 107 estimates the channel state from the reference signals included in the received signals separated in the data channel signal separation section 106, and reports the estimated channel state to the control channel demodulation section 108.

The received signal pertaining to user #K, separated in the data channel signal separation section 106, is demapped in a subcarrier demapping section, which is not shown, converted back to a time sequence signal, and then demodulated in the data demodulation section 109. Then, a channel decoding process is executed in a channel decoding section, which is not shown, and the received data is acquired.

The control channel demodulation section 108 demodulates the control channel signals (for example, the PDCCH) included in the received signals separated in the data channel signal separation section 106. When this takes place, in the control channel demodulation section 108, the control channel signal corresponding to user #K is demodulated based on the channel state reported from the channel estimation section 107. Each control channel signal demodulated by the control channel demodulation section 108 is output to the channel quality measurement section 110.

The channel quality measurement section 110 measures channel quality (CQI) based on the control channel signals received as input from the control channel demodulation section 108. Also, the channel quality measurement section 110 selects the PMI and RI based on the CQI measured. At this time, the PMI is selected from a codebook that is set in advance based on the state of the distribution of user terminals in the cell. Then, the CQI, PMI and RI are reported to a CSI feedback signal generating section 111 and a MIMO switching section 112.

In the CSI feedback signal generating section 111, a CSI feedback signal (for example, the PUCCH) to feed back to the radio base station apparatus 200 is generated. In this case, the CQI, PMI and RI reported from the channel quality measurement section 110 are included in the CSI feedback signal. The CSI feedback signal generated in the CSI feedback signal generating section 111 is output to a multiplexer (MUX) 113.

The MIMO switching section 112 selects the MIMO transmission scheme to use for transmission data #K based on the CQI, PMI and RI received as input from the channel quality measurement section 110. Then, the channel coding rate and modulation scheme for transmission data #K, to match the selected MIMO transmission scheme, are determined. The determined channel coding rate is output to the channel coding section 114, and the determined modulation scheme is output to the data modulation section 115.

Meanwhile, transmission data #K pertaining to user #K, output from a higher layer, is subjected to channel coding by the channel coding section 114, and then subjected to data modulation in the data modulation section 115. Transmission data #K, subjected to data modulation in the data modulation section 115, is converted from a time sequence signal to a frequency domain signal in a serial-to-parallel conversion section, which is not shown, and output to a subcarrier mapping section 116.

The subcarrier mapping section 116 maps transmission data #K to subcarriers in accordance with schedule information that is designated from the radio base station apparatus 200. At this time, the subcarrier mapping section 116 maps (multiplexes) reference signal #K, generated in a reference signal generating section, which is not shown, to subcarriers, with transmission data #K. Transmission data #K, mapped to subcarriers in this way, is output to a precoding multiplication section 117.

A precoding multiplication section 117 applies a phase and/or amplitude shift to transmission data #K for each of antennas RX #1 to RX #N. At this time, the precoding multiplication section 117 applies a phase and/or amplitude shift in accordance with a precoding vector that corresponds to the PMI that is designated by the control channel signal demodulated in the control channel demodulation section 108. Transmission data #K, having been subjected to a phase and/or amplitude shift by the precoding multiplication section 117, is output to the multiplexer (MUX) 113.

In the multiplexer (MUX) 113, transmission data #K, subjected to a phase and/or amplitude shift, and the control signal generated by the CSI feedback signal generating section 111, are combined, and transmission signals are generated for each of antennas RX #1 to RX #N. The transmission signals generated by the multiplexer (MUX) 113 are subjected to an inverse fast Fourier transform in inverse fast Fourier transform section (IFFT sections) 118 #1 to 118 #N and converted from frequency domain signals to time domain signals, and, after that, attached CPs in CP adding section 119 #1 to 119 #N and output to RF transmitting circuits 120 #1 to 120 #N. Then, a frequency conversion process to convert into a radio frequency band is performed in RF transmitting circuits 120 #1 to 120 #N, and, after that, output to antennas RX #1 to RX #N via duplexers 101 #1 to 101 #N and output from antennas RX #1 to RX #N to the radio base station apparatus 200 on the uplink.

According to a radio communication method in a radio communication system having a radio base station apparatus to form such a cell and user terminals to establish radio connection with this radio base station apparatus, the radio base station apparatus selects precoding vectors from a codebook that is set in advance based on the state of the distribution of user terminals in the cell, using an uplink signal, and multiplies signals to supply to each antenna element by the selected precoding vectors. Then, the signals multiplied by the precoding vectors are transmitted to the user terminals.

The user terminal receives beams from the radio base station apparatus, extracts the reference signals from the received beams and measures channel quality, and feeds back a communication quality feedback signal including the measured channel quality to the radio base station apparatus via the uplink.

In this way, a codebook to take into account the unevenness of user terminals in the service area is set, and precoding vectors in the codebook are selected based on communication quality information that is fed back from user terminals or based on communication quality information that is determined from an uplink signal in the radio base station apparatus, so that the system capacity increases.

Now, although the present invention has been described in detail with reference to the above embodiment, it should be obvious to a person skilled in the art that the present invention is by no means limited to the embodiment described herein. For example, the number of users and the number of processing sections in the devices in the above embodiment are by no means limiting, and it is equally possible to change these as appropriate depending on device configurations. Furthermore, the present invention can be implemented with various corrections and in various modifications, without departing from the spirit and scope of the present invention defined by the recitation of the claims. Consequently, the descriptions herein are provided only for the purpose of explaining examples, and should by no means be construed to limit the present invention in any way.

The disclosure of Japanese Patent Application No. 2011-177605, filed on Aug. 15, 2011, including the specification, drawings and abstract, is incorporated herein by reference in its entirety.

The invention claimed is:

1. A radio communication system comprising a radio base station apparatus to form a cell and user terminals to establish radio connection with the radio base station apparatus, wherein:

the radio base station apparatus comprises:
an array antenna having a plurality of antenna elements that are arranged in one direction;
a processor configured to select precoding vectors from a codebook formed with precoding vectors that are set in advance to be uneven with respect to the direction of the arrangement of the antenna elements, such that the angle of transmission beams corresponding to the precoding vectors with respect to the direction of the arrangement of the antenna elements assumes angular intervals taking into account the unevenness of the distribution of the user terminals instead of assuming regular angular intervals, based on communication quality information that is fed back from the user terminals in the cell;
wherein the processor is configured to multiply signals to supply to each antenna element by the selected precoding vectors; and
a transmitter configured to transmit the signals multiplied by the precoding vectors to the user terminals; and the user terminals comprise:
a receiver configured to receive a signal from the radio base station apparatus;
a processor configured to extract a reference signal from the received signal and measure channel quality; and
a transmitter configured to feed back a communication quality feedback signal, including the measured channel quality, to the radio base station apparatus, via an uplink.

2. The radio communication system according to claim 1, wherein the codebook is formed with precoding vectors that make a reciprocal of a density of the user terminals uniform.

3. The radio communication system according to claim 1, wherein, when ρ(L) is a distribution function of the user terminals with respect to a distance from the radio base station apparatus and L[m] is the distance from the radio base station apparatus, the codebook is formed with precoding vectors that are determined from the following equation:

$$\text{CODEBOOK}\,V[0,1,\ldots M-1]=\exp(2\pi d\cdot j\,\cos(\alpha+\pi/2)\cdot [0,1,2,\ldots,N-1])$$

$$\alpha = a\,\tan(h/(\rho(L\cdot [0,1,\ldots M-1])))$$

where h is a height of the radio base station apparatus, d is an interval of branches, which are groups of a plurality of antenna elements, a is a tilt angle of transmission beams directed to the user terminals UE with respect to a horizontal direction, and N is the number of branches.

4. The radio communication system according to claim 3, wherein, when the user terminals are distributed evenly with respect to the distance from the radio base station apparatus, the codebook is formed with precoding vectors that are determined by the following equation:

$$\text{CODEBOOK}\,V[0,1,\ldots M-1]=\exp(2\pi d\cdot j\,\cos(\alpha+\pi/2)\cdot [0,1,2,\ldots,N-1])$$

$$A = a\,\tan(h/(L\max/M)\cdot[0,1,\ldots M-1]))$$

5. The radio communication system according to claim 3, wherein, when the user terminals are distributed squarefold with respect to the distance from the radio base station apparatus, the codebook is formed with precoding vectors that are determined from the following equation:

$$\text{CODEBOOK}\,V[0,1,\ldots M-1]=\exp(2\pi d\cdot j\,\cos(\alpha+\pi/2)\cdot [0,1,2,\ldots,N-1])$$

$$\alpha = a\,\tan(h/(L\max/\mathrm{sqrt}(2)\hat{}\,[M-1,\ldots 1,0]))$$

6. The radio communication system according to claim 2, wherein, when ρ(L) is a distribution function of the user terminals with respect to a distance from the radio base station apparatus and L[m] is the distance from the radio base station apparatus, the codebook is formed with precoding vectors that are determined from the following equation:

$$\text{CODEBOOK } V[0,1,\ldots M-1] = \exp(2\pi d \cdot j \cos(\alpha + \pi/2) \cdot [0,1,2,\ldots,N-1])$$

$$\alpha = a\tan(h/(\rho(L \cdot f[0,1,\ldots M-1])))$$

where h is a height of the radio base station apparatus, d is an interval of branches, which are groups of a plurality of antenna elements, a is a tilt angle of transmission beams directed to the user terminals UE with respect to a horizontal direction, and N is the number of branches.

7. A radio base station apparatus in a radio communication system comprising the radio base station apparatus to form a cell and user terminals to establish radio connection with the radio base station apparatus, the radio base station apparatus comprising:
   an array antenna having a plurality of antenna elements that are arranged in one direction;
   a processor configured to select precoding vectors from a codebook formed with precoding vectors that are set in advance to be uneven with respect to the direction of the arrangement of the antenna elements, such that the angle of transmission beams corresponding to the precoding vectors with respect to the direction of the arrangement of the antenna elements assumes angular intervals taking into account the unevenness of the distribution of the user terminals instead of assuming regular angular intervals, based on communication quality information of the user terminals in the cell;
   wherein the processor is configured to multiply signals to supply to each antenna element by the selected precoding vectors; and
   a transmitter configured to transmit the signals multiplied by the precoding vectors to the user terminals.

8. A user terminal in a radio communication system comprising a radio base station apparatus to form a cell and user terminals to establish radio connection with the radio base station apparatus, the user terminal comprising:
   a receiver configured to receive a signal transmitted from the radio base station apparatus using a codebook formed with precoding vectors that are set in advance in the radio base station apparatus to be uneven with respect to a direction of arrangement of antenna elements, such that the angle of transmission beams corresponding to the precoding vectors with respect to the direction of the arrangement of the antenna elements assumes angular intervals taking into account the unevenness of the distribution of the user terminals instead of assuming regular angular intervals, based on communication quality information of the user terminals in the cell;
   a processor configured to extract a reference signal from the received signal and measure channel quality; and
   a transmitter configured to feed back a communication quality feedback signal, including the measured channel quality, to the radio base station apparatus, via an uplink.

9. A radio communication method in a radio communication system comprising a radio base station apparatus to form a cell and user terminals to establish radio connection with the radio base station apparatus, the radio communication method comprising the steps of:
   at the radio base station apparatus:
   selecting precoding vectors from a codebook formed with precoding vectors that are set in advance to be uneven with respect to the direction of arrangement of antenna elements, such that the angle of transmission beams corresponding to the precoding vectors with respect to the direction of the arrangement of the antenna elements assumes angular intervals taking into account the unevenness of the distribution of the user terminals instead of assuming regular angular intervals, based on communication quality information of the user terminals in the cell;
   multiplying signals to supply to each antenna element by the selected precoding vectors; and
   transmitting the signals multiplied by the precoding vectors to the user terminals,
   at the user terminal:
   receiving a signal from the radio base station apparatus;
   extracting a reference signal from the received signal and measuring channel quality; and
   feeding back a communication quality feedback signal, including the measured channel quality, to the radio base station apparatus, via an uplink.

* * * * *